United States Patent
Thiel

[11] 3,874,779
[45] Apr. 1, 1975

[54] VARIABLE RATIO LIGHT COUPLER

[75] Inventor: Frank L. Thiel, Painted Post, N.Y.

[73] Assignee: Corning Glass Works, Corning, N.Y.

[22] Filed: July 5, 1973

[21] Appl. No.: 376,578

[52] U.S. Cl. .......... 350/96 WG, 350/96 C, 350/173
[51] Int. Cl. ............................................ G02b 5/14
[58] Field of Search........... 350/96 R, 96 B, 96 WG, 350/169–174, 285

[56] References Cited
UNITED STATES PATENTS

| | | | |
|---|---|---|---|
| 3,156,825 | 11/1964 | Lines | 350/285 X |
| 3,444,478 | 5/1969 | Gudmundsen et al. | 350/285 X |
| 3,614,211 | 10/1971 | Letter | 350/285 |
| 3,716,804 | 2/1973 | Groschwitz | 350/96 WG UX |

*Primary Examiner*—John K. Corbin
*Attorney, Agent, or Firm*—William J. Simmons, Jr.; Clarence R. Patty, Jr.

[57] ABSTRACT

A coupler disposed between two sections of optical signal transmission line for extracting from one of the sections a fraction of the energy transmitted thereby. The coupler comprises first and second 45° right prisms which are so disposed that the large area planar surfaces thereof are slightly spaced and are parallel. Disposed between the prisms is a sheet of transparent material having a refractive index lower than the refractive indices of the prisms. The transparent sheet is slidably disposed between the two prisms so that it can easily be replaced by another sheet having a different refractive index. Input light from one of the sections of transmission line is coupled to one of the prisms and impinges upon the prism-sheet interface at such an angle that a fraction of the input light reflects from the interface and is thus extracted from the optical signal transmission line. The remainder of the input light passes through the sheet of transparent material into the second prism, and after propagating therethrough, is coupled to the second section of optical signal transmission line.

18 Claims, 6 Drawing Figures

VARIABLE RATIO LIGHT COUPLER

CROSS-REFERENCES TO RELATED APPLICATIONS

This application is related to U.S. Pat. Application Ser. No. 376,579 entitled "Optical Coupler" filed on even date herewith and assigned to the assignee of the present application.

BACKGROUND OF THE INVENTION

The continually increasing amount of traffic that communications systems are required to handle has hastened the development of high capacity systems. Even with the increased capacity made available by systems operating between $10^9$ Hz and $10^{12}$ Hz, traffic growth is so rapid that saturation of such systems is anticipated in the very near future. High capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at carrier frequencies around $10^{15}$ Hz.

The transmitting media required in the transmission of frequencies around $10^{15}$ Hz are hereinafter referred to as optical signal transmission lines which consist of a single optical waveguide or a bundle thereof. Optical waveguides normally consist of an optical fiber having a transparent core surrounded by a layer of transparent cladding material having a refractive index which is lower than that of the core. Although the theory of optical waveguides has been known for sometime, practical optical waveguides that do not absorb an excessive amount of transmitted light have been developed only recently. U.S. Pat. No. 3,659,915 discloses a low loss optical waveguide comprising a cladding layer of fused silica and a core of fused silica doped with one or more materials that selectively increase the index of refraction of the core above that of the cladding.

To establish between a plurality of stations an optical communication network, i.e., one employing optical signal transmission lines, a variety of interconnection schemes may be utilized. Each station can be "hard wired" to every other station, but when many stations must be interconnected, the excessive amount of optical signal transmission line required causes this method to be undesirable due to both the cost of the transmission line and the space consumed thereby. The stations may be interconnected by a loop or line data bus which drastically reduces the required amount of optical signal transmission line. A line data bus can be used, for example, to connect a central processing unit (CPU) to a plurality of stations. Such a network may consist of a single optical signal transmission line connected to the CPU, a coupler being required to extract information from the transmission line at each station as well as to inject information from each station onto the transmission line. Where N stations are connected by the transmission line to the CPU, a smaller percentage of the energy transmitted through the transmission line must be extracted therefrom by the first station than by the (N − 1)th station which is further away from the CPU than the first station. Obviously, identical couplers cannot be used in such a system since a different fraction of the transmitted light is extracted by each station. Moreover, if the number of stations connected to the transmission line is increased or decreased, the extraction ratio of all the previously used couplers should be changed. Unless the extraction ratio of the couplers is variable, they must be replaced by others having the proper extraction ratio.

SUMMARY OF THE INVENTION

It is therefore an object of the present invention to provide an optical signal coupler that is capable of extracting a variable amount of light from an optical signal transmission line into which it is inserted.

Briefly, the present invention relates to a variable ratio light coupler for use in an optical communication system including first and second sections of optical signal transmission line. The coupler comprises first and second spaced transparent members, the first transparent member having first and second opposed, non-parallel planar surfaces and a third planar surface intersecting the second planar surface and making an acute angle therewith. The second transparent member has first and second opposed planar surfaces, the second planar surface of the second member being parallel to and slightly spaced from the second planar surface of the first member. A layer of transparent material is disposed between the first and second members, the refractive index of the layer being less than that of the first and second members. First coupling means is disposed adjacent to the first surface of the first member for coupling light from the first section of transmission line into the first member, the longitudinal axis of the first section of transmission making an angle other than 90° with respect to the second planar surface of the first member. Second coupling means is disposed adjacent to the third planar surface of the first member for coupling light between the first member and output means. Third coupling means is disposed adjacent to the first surface of the second member for coupling light from the second member into the second section of optical signal transmission line. Means is provided for changing the material of the layer so that the refractive index of the medium between the first and second members is changed and the amount of light extracted from the optical signal transmission line can be easily changed.

DESCRIPTION OF THE PREFERRED EMBODIMENTS

Figure 1:
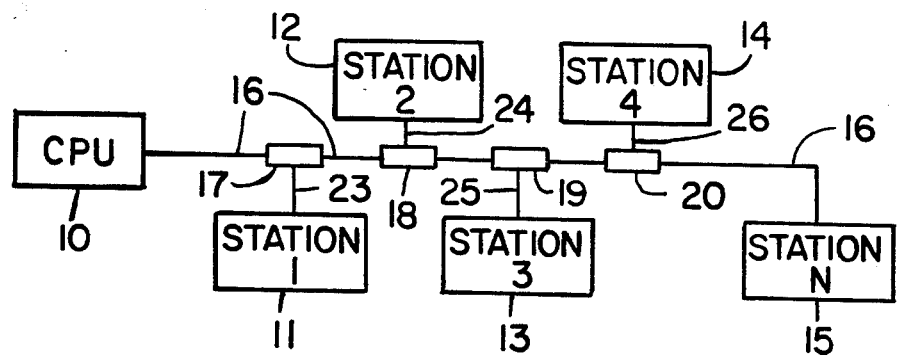
FIG. 1 is a schematic illustration in block diagram form of a line data bus.

FIG. 1 is a schematic illustration in block diagram form of a line data bus wherein a central processing unit 10 is coupled to a plurality of stations 11 through 15 by an optical signal transmission line 16. A different percentage of the signal propagating in transmission line 16 is extracted by each of the couplers 17 through 20, and the extracted signal is coupled to respective stations 11 through 14. In the embodiment of FIG. 1 the signal is coupled from couplers 17 through 20 to stations 11 through 14 by short auxiliary transmission lines 23 through 26 respectively.

Figure 2:
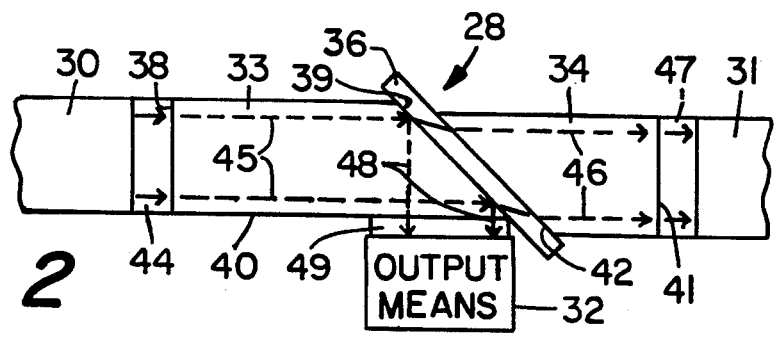
FIG. 2 is a schematic illustration of a coupler constructed in accordance with the present invention.

Couplers 17 through 20 may be of the type illustrated in FIG. 2 which is a schematic illustration of a coupler constructed in accordance with the present invention. Coupler 28 is disposed between two sections 30 and 31 of optical signal transmission line for coupling a fraction of the input light propagating in transmission line 30 to output means 32. The remainder of the input light being coupled to transmission line 31. Coupler 28 comprises first and second transparent members 33 and 34 separated by a layer 36 of transparent material. As used herein, the work "transparent" indicates transparency to those wavelengths of light that are transmitted by the associated optical signal transmission lines. Transparent member 33 has a first planar surface 38 which is adapted to receive light from optical signal transmission line 30 and a second planar surface 39 which is disposed opposite surface 38. Surfaces 38 and 39 are preferably non-parallel, and surface 38 is preferably perpendicular to the axis of transmission line 30. A third planar surface 40 intersects surfaces 38 and 39 and makes an acute angle with surface 39. Member 34 has first and second opposed planar surfaces 41 and 42, surface 42 being parallel to surface 39. Light radiating from transmission line 30 is coupled to member 33 by coupling means 44, and that input light propagating through member 33 is illustrated by dashed lines 45. That portion of the input light which passes through layer 36 propagates through member 34, as illustrated by dashed lines 46, and is coupled to transmission line 31 by coupling means 47. As illustrated by dashed lines 48 a portion of the input light reflects from the interface between member 33 and layer 36 and is coupled to output means 32 by coupling means 49. Output means 32 may consist of a light detector disposed in light receiving relationship with respect to member 33, or it may consist of an auxiliary optical signal transmission line for propagating light extracted from member 33 to a remote detector. Coupling means 44, 47 and 49 are utilized for efficiently propagating light between various light conducting elements of FIG. 2 and may consist of such transparent media as index matching fluid, light conducting rods or fibers and combinations thereof.

The refractive index $n_1$ of member 33 is preferably equal to that of member 34, and the refractive index $n_2$ of layer 36 is less than $n_1$. The refractive indices $n_1$ and $n_2$ and the angle between planar surface 39 and the axis of transmission line 30 are selected to cause a desired fraction $r$ of the energy transmitted by transmission line 30 to be extracted by coupler 28 and propagated to output means 32. The fraction $r$ can be easily varied by replacing layer 36 by a layer of another material having a refractive index different from that of the original layer.

In order to change the amount of light extracted from coupler 28, various means can be provided for changing the refractive index between members 33 and 34. For example, layer 36 may be a thin sheet of transparent material that can be removed and replaced by another sheet having a different refractive index. Layer 36 could also consist of two or more sheets of transparent material disposed end-to-end, the refractive index of the material between members 33 and 34 being varied by sliding the plurality of sheets until the proper one is disposed between the two members.

Figure 3:
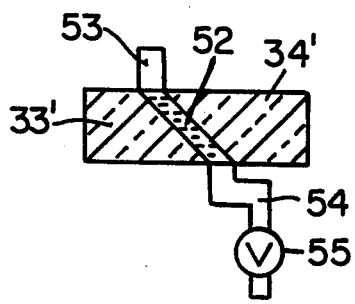
FIG. 3 is a modification of the present invention employing a solid-liquid light reflecting interface.

Still another means for changing the refractive index of the layer 36 is illustrated in FIG. 3 wherein elements similar to those of FIG. 2 are indicated by primed reference numerals. Transparent members 33' and 34' form two walls of a reservoir for retaining a transparent fluid 52 which may consist of water, glycerine, oil or the like. The reservoir may be filled through a pipe 53 connected to one end thereof and drained through a pipe 54 connected to another end thereof, a drain valve 55 being disposed in pipe 54. To change the fraction $r$, fluid 52 is drained and is replaced by another fluid having a different refractive index.

Figure 4:
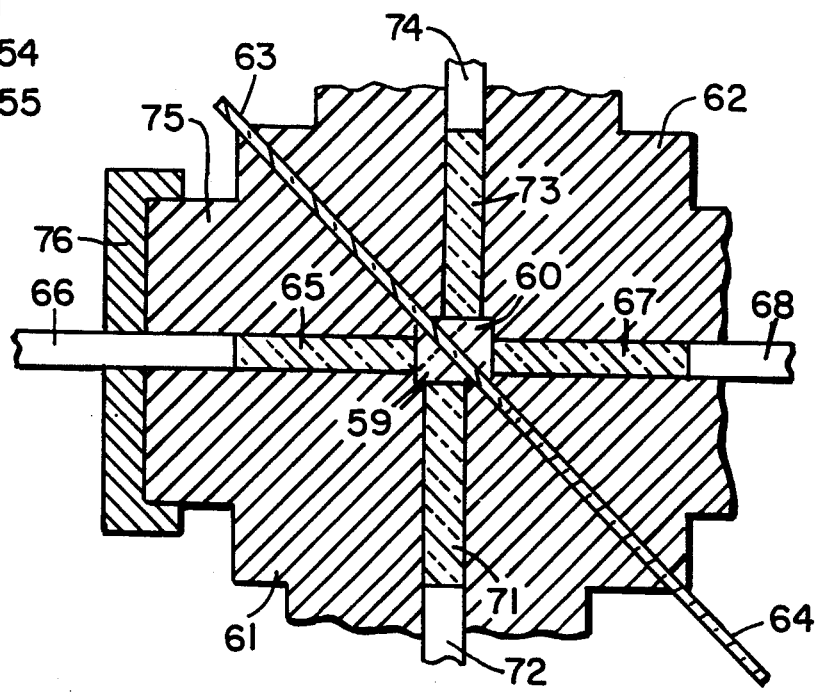
FIG. 4 is a cross-sectional view of a preferred embodiment of the present invention.

In the preferred embodiment illustrated in FIG. 4 the previously described transparent members consist of 45° right prisms 59 and 60 which are disposed in support sections 61 and 62 respectively. Support sections 61 and 62 and prisms 59 and 60 are slightly spaced, and thin glass sheets 63 and 64 are slidably disposed therebetween, sheet 63 extending between the prisms. As indicated previously the refractive indices of sheets 63 and 64 must be lower than those of prisms 59 and 60. A transparent glass rod 65 couples light from a first section 66 of optical signal transmission line into prism 59, and a transparent glass rod 67 couples light from prism 60 into a second section 68 of optical signal transmission line. A glass rod 71 couples the extracted light signal from prism 59 to an auxiliary optical signal transmission line 72. A fourth transparent glass rod 73 is available for coupling light from a second auxiliary optical signal transmission line 74 to prism 60. Rods 65, 67, 71 and 73 are cylindrically shaped, the endfaces thereof being planar surfaces that are perpendicular to the axes thereof.

Support sections 61 and 62 may each be provided with extended portions which are adapted to receive the optical signal transmission lines. For the sake of simplicity, only extended portion 75 is completely illustrated. Member 76, which is affixed to optical signal transmission line 66, is threaded to or otherwise affixed to extended portion 75 in such a manner that transmission line 66 is forced into engagement with the end of glass rod 65.

The refractive indices of glass rods 65, 67, 71 and 73 and those of prisms 59 and 60 are preferably identical. All optical interfaces such as those between the glass rods and the transmission lines, those between the glass rods and the prisms and those between the prisms and the glass sheet are preferably provided with an index matching fluid for the purpose of reducing Fresnel reflections.

Figure 5:
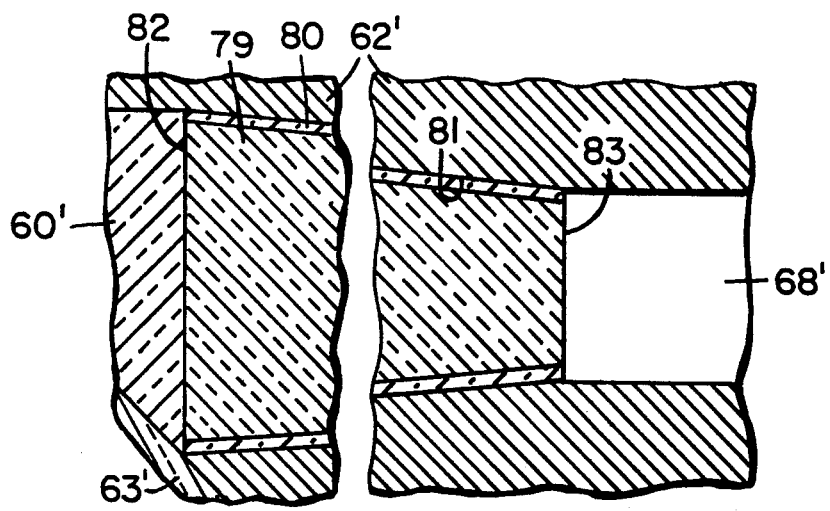
FIG. 5 is a fragmentary cross-sectional view of a modification of the embodiment of FIG. 4.

It is preferred that the output ports, i.e. those containing glass rods 67 and 71, be provided with tapered rods, the wider end of the rods being disposed adjacent to the prisms, since light diverges slightly as it radiates from the transmission line and propagates through the prisms. A fragmentary view of a tapered output port is illustrated in FIG. 5 wherein elements similar to those of FIG. 4 are illustrated by primed reference numerals. This embodiment also illustrates the use of a cladding layer on the light conducting rod. A tapered fiber consisting of tapered core or rod 79 of transparent material having a layer 80 of transparent cladding material disposed on the surface thereof is disposed in a tapered bore 81 in support section 62'. The refractive index of core 79 is higher than that of layer 80. The larger endface 82 of core 79 is disposed adjacent to prism 60' to enable a greater amount of light propagating through the prism to be gathered and coupled to section 68' of transmission line. The size of smaller endface 83 of the tapered fiber is substantially equal to the diameter of section 68' of transmission line.

Figure 6:
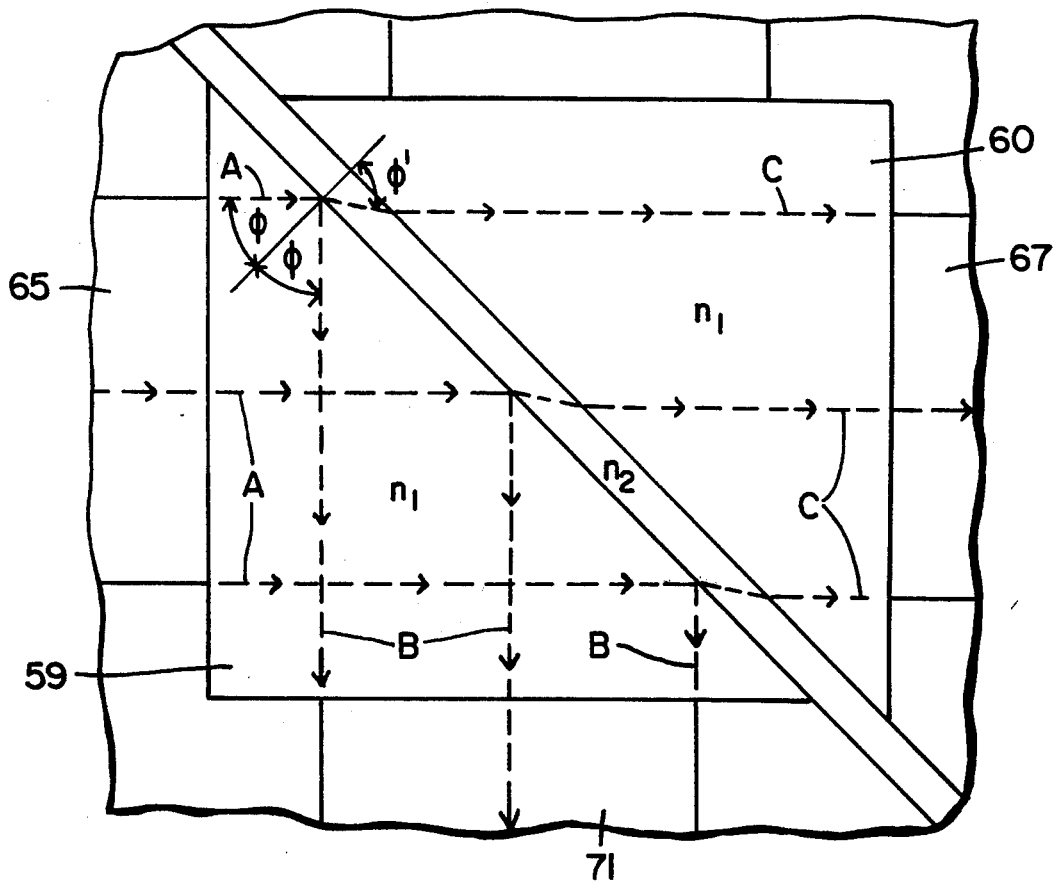
FIG. 6 is an enlarged diagram of the light reflecting portion of FIG. 4 illustrating the operation thereof.

The operation of the coupler illustrated in FIG. 4 will be described in connection with the diagram illustrated in FIG. 6. Input light enters prism 59 as indicated by dashed lines A, and a fraction r thereof is reflected toward glass rod 71 as indicated by dashed lines B. It can be shown from Fresnel's laws of reflection that $$r = 1/2 \left[ \left(\frac{1-n\alpha}{1+n\alpha}\right)^2 + \left(\frac{n-\alpha}{n+\alpha}\right)^2 \right] \quad (1)$$

where $n$ equals $n_1/n_2$ and $\alpha$ equals $\cos\phi/\cos\phi'$. By changing the material which separates prisms 59 and 60, $n_2$ can be varied. Thus, $n$ and $\alpha$ can be varied, and hence the fraction $r$ of light extracted by the coupler can be varied. Couplers having different light extraction fractions can therefore be manufactured from identically formed parts.

That light which does not reflect from the interface between prism 59 and 60 is refracted into layer 63. Prism 60 refracts the non-reflected light again so that this light is returned to its original direction of propagation as indicated by dashed lines C if the refractive index of prism 60 is equal to that of prism 59.

To provide a coupler capable of extracting a wide range of energy from a transmission line, the refractive index $n_1$ of prisms 59 and 60 should be relatively high. If the material from which layer 63 is formed is to be a solid sheet, the value of $n_2$ can range from about 1.39 (e.g. $MgF_2$) to about 1.77 (e.g., flint glass), with most of the range between 1.45 and 1.77 being covered by various glasses. If prisms 59 and 60 are constructed from a dense flint glass having a refractive index of 1.95 the aforementioned range of values of $n_2$ will provide extraction ratios from more than 40% down to about 0.5%.

As a specific example, consider a coupler of the type illustrated in FIG. 4 constructed from prisms having a refractive index of 1.95 separated by a glass sheet having a refractive index of 1.50. In this situation n is equal to $n_1/n_2$ which equals 1.30. The ratio $\sin\phi'/\sin\phi$ is also equal to $n_1/n_2$. In the embodiment illustrated, wherein 45° right prisms are utilized, the angle $\phi$ is 45°. $\sin\phi$ is therefore 0.70711, and the angle $\phi'$ can be found to be 66.815°. Hence, $\alpha$, $\cos\phi/\cos\phi'$, can be calculated to be 1.796, and thus, the reflection ratio $r$ can be calculated from equation (1) to be 12%.

The coupler of the present invention can also be utilized to couple light into an optical signal transmission line. If light is to be coupled into transmission line 68, light is injected from auxiliary transmission line 74 into glass rod 73. Similarly, light can be introduced into optical signal transmission line 66 by injecting light from transmission line 72 into glass rod 71. In either case, only that fraction $r$ of the light injected into the coupler from transmission line 72 or 74 is actually propagated in optical signal transmission line 66 or 68, respectively.

Various modifications and additions may be made to the above-described embodiments without departing from the scope of the invention disclosed. For example, although 45° right prisms are employed in the preferred embodiment, the present invention also encompasses couplers having light reflecting interfaces that make angles other than 45° with respect to the direction of propagation of the input light. Furthermore, the indices of refraction of the two prisms need not be identical, but it is to be noted that in such an embodiment the axes of the input and output light coupling rods and transmission lines would not be parallel and that such an embodiment would probably be more difficult to fabricate. Also, the prisms and one or more of the light conducting rods associated therewith could be of unitary construction, thereby eliminating one or more light-reflecting interfaces.

I claim:

1. A variable ratio light coupler for use in an optical communication system including first and second sections of optical signal transmission line, said coupler comprising a first transparent member having first and second opposed, nonparallel planar surfaces and a third planar surface intersecting said second planar surface and making an acute angle therewith, a second transparent member having first and second opposed nonparallel planar surfaces and a third planar surface intersecting said second planar surface and making an acute angle therewith, said second surface of said second member being parallel to and slightly spaced from said second surface of said first member, a layer of transparent material disposed between said first and second members, the refractive index of said layer being less than that of said first and second members, first coupling means disposed adjacent to said first surface of said first member, said first coupling means being adapted to couple light from said first section of optical signal transmission line into said first member, the longitudinal axis of said first section of transmission line making an angle other than 90° with said second surface of said first member, output means for receiving that light which reflects from the interface between said first member and said layer, second coupling means disposed adjacent to said third surface of said first member for coupling light between said first member and said output means, third coupling means disposed adjacent to said first surface of said second member for coupling light from said second member into said second section of optical signal transmission line, and means for changing the material of said layer, thereby changing the refractive index of the medium between said first and second members.

2. A light coupler in accordance with claim 1 wherein said output means comprises an auxiliary optical signal transmission line having one end disposed adjacent to said second coupling means.

3. A light coupler in accordance with claim 1 wherein said layer of transparent material comprises a sheet of material that is slidably disposed between said first and second members.

4. A light coupler in accordance with claim 3 wherein said sheet comprises a plurality of sections each having a different refractive index.

5. A light coupler in accordance with claim 1 where said layer of transparent material comprises a liquid.

6. A light coupler in accordance with claim 1 wherein the refractive index of said first member is equal to the refractive index of said second member.

7. A light coupler in accordance with claim 1 wherein said first and second members are first and second right prisms, respectively, said second surfaces of said first and second members constituting the large area faces of said prisms.

8. A light coupler in accordance with claim 7 wherein said prisms are 45° right prisms.

9. A light coupler in accordance with claim 8 wherein the first surface of said first and second members are perpendicular to the axes of said first and second transmission lines, respectively.

10. A variable ratio light coupler comprising first and second right prisms of transparent material, each of said prisms having first and third planar surfaces of substantially equal area and a second planar surface of greater area than said first and third surfaces, the second surface of said second prism being parallel to and slightly spaced from the second surface of said first prism, a layer of transparent material disposed between said first and second prisms, the refractive index of said layer being less than that of said first and second prisms, means for changing the material of said layer, thereby changing the refractive index of the medium between said first and second right prisms, and first, second and third elongated rods of transparent material, each of said rods terminating in first and second planar endfaces that are substantially perpendicular to the longitudinal axis thereof, said first endface of said first rod being disposed adjacent to the first surface of said first prism, the axis of said first rod being substantially perpendicular to said first surface of said first prism, said first endface of said second rod being disposed adjacent to said third surface of said first prism, the longitudinal axis of said second rod being substantially perpendicular to said third surface of said first prism, said first endface of said third rod being disposed adjacent to the first surface of said second prism, the longitudinal axis of said third rod being substantially perpendicular to said first surface of said second prism.

11. A light coupler in accordance with claim 10 wherein said layer comprises a sheet of transparent material slidably disposed between said first and second members.

12. A light coupler in accordance with claim 11 wherein said sheet comprises a plurality of sections each having a different refractive index.

13. A light coupler in accordance with claim 11 wherein said second and third rods are tapered, the first endfaces of said second and third rods being larger than the second endfaces thereof, 14. A light coupler in accordance with claim 11 wherein said rods are provided with a layer of transparent cladding material disposed on the surface thereof, the refractive index of said cladding material being lower than that of said rods.

15. A light coupler in accordance with claim 11 further comprising a fourth elongated rod of transparent material having a first planar endface disposed adjacent to said third surface of said second prism, the longitudinal axis of said fourth rod being substantially perpendicular to said third surface of said second prism.

16. A light coupler in accordance with claim 11 wherein the refractive index of said first prism is equal to that of second prism.

17. A light coupler in accordance with claim 11 wherein said prisms are 45° right prisms.

18. A light coupler in accordance with claim 11 further comprising first, second and third means for connecting an optical signal transmission line to said second endfaces of said first, second and third rods, respectively.

* * * * *